US008311726B2

(12) United States Patent
Patel et al.

(10) Patent No.: US 8,311,726 B2
(45) Date of Patent: Nov. 13, 2012

(54) AD-HOC MOBILE IP NETWORK FOR INTELLIGENT TRANSPORTATION SYSTEM

(75) Inventors: Labhesh Patel, San Francisco, CA (US); Sanjeev Kumar, San Francisco, CA (US); Shmuel Shaffer, Palo Alto, CA (US); Mukul Jain, San Jose, CA (US); Randall Paul Joseph Ethier, Burke, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/241,966

(22) Filed: Sep. 23, 2011

(65) Prior Publication Data

US 2012/0016536 A1 Jan. 19, 2012

Related U.S. Application Data

(63) Continuation of application No. 12/902,012, filed on Oct. 11, 2010, now Pat. No. 8,036,782, which is a continuation of application No. 11/619,941, filed on Jan. 4, 2007, now Pat. No. 7,813,843.

(51) Int. Cl.
*G06F 7/00* (2006.01)
*G08G 1/00* (2006.01)

(52) U.S. Cl. ........................................... 701/117; 701/1

(58) Field of Classification Search .................. 701/1-2, 701/117-119

See application file for complete search history.

(56) References Cited

U.S. PATENT DOCUMENTS

| | | | |
|---|---|---|---|
| 6,023,232 | A | 2/2000 | Eitzenberger |
| 6,154,658 | A | 11/2000 | Caci |
| 6,356,838 | B1 | 3/2002 | Paul |
| 6,480,783 | B1 | 11/2002 | Myr |
| 6,594,576 | B2 | 7/2003 | Fan et al. |
| 6,678,614 | B2 | 1/2004 | McCarthy et al. |
| 6,694,247 | B2 | 2/2004 | Hameleers et al. |
| 6,792,348 | B2 | 9/2004 | Hameleers et al. |
| 6,801,832 | B2 | 10/2004 | Park et al. |
| 6,853,910 | B1 | 2/2005 | Oesterling et al. |
| 6,862,500 | B2 | 3/2005 | Tzamaloukas |
| 6,862,524 | B1 | 3/2005 | Nagda et al. |
| 6,978,206 | B1 | 12/2005 | Pu et al. |
| 7,164,117 | B2 | 1/2007 | Breed et al. |

(Continued)

OTHER PUBLICATIONS

"U.S. Appl. No. 11/619,941, Non-Final Office Action mailed Nov. 4, 2009.", 11 pgs.

(Continued)

*Primary Examiner* — Yonel Beaulieu
(74) *Attorney, Agent, or Firm* — Schwegman, Lundberg & Woessner, P.A.

(57) ABSTRACT

A method for intelligently managing a transportation network is provided. The method may include providing a roadside apparatus 18 to communicate with nodes 14A to 14D associated with vehicles 12A to 12D in a transportation network, the vehicle nodes being in a neighborhood range of the roadside apparatus. The roadside apparatus may dynamically detect the presence of a node 14A associated with a first vehicle 12A, and establish a mobile Internet Protocol (IP) network between the roadside apparatus and the first vehicle's node. The roadside apparatus 18 receives, in real-time, from the first vehicle's node 14A event data of events associated with the first vehicle 12A over the mobile IP network. The roadside apparatus 18 or nodes 14A to 14D may further receive or transmit real-time command data to control subsystems of a vehicle.

20 Claims, 11 Drawing Sheets

U.S. PATENT DOCUMENTS

| | | | |
|---|---|---|---|
| 7,283,904 | B2 | 10/2007 | Benjamin et al. |
| 7,663,502 | B2 | 2/2010 | Breed |
| 7,813,843 | B2 | 10/2010 | Patel et al. |
| 8,036,782 | B2 * | 10/2011 | Patel et al. ........................ 701/1 |
| 2004/0073361 | A1 | 4/2004 | Tzamaloukas et al. |
| 2008/0167774 | A1 | 7/2008 | Patel et al. |
| 2011/0106337 | A1 | 5/2011 | Patel et al. |

OTHER PUBLICATIONS

"U.S. Appl. No. 11/619,941, Notice of Allowance mailed Jun. 7, 2010", 6 pgs.

"U.S. Appl. No. 11/619,941, Response filed Mar. 4, 2010 to Non Final Office Action mailed Nov. 4, 2010", 17 pgs.

"U.S. Appl. No. 12/902,012, Non Final Office Action mailed Feb. 10, 2011", 7 pgs.

"U.S. Appl. No. 12/902,012, Notice of Allowance mailed Jun. 6, 2011", 7 pgs.

"U.S. Appl. No. 12/902,012, Response filed May 6, 2011 to Non Final Office Action mailed Feb. 10, 2011", 9 pgs.

Hedrick, J. K., et al., "Research Reports—Optimized Vehicle Control/Communication Interaction in an Automated Highway System", http://repositories.cdlib.org/its/path/reports/UCB-ITS-PRR-2001-29, Institute of Transportation Studies, California Partners for Advanced Transit and Highways (PATH) (University of California, Berkeley), (2001), 134 pgs.

* cited by examiner

AD-HOC MOBILE IP NETWORK FOR INTELLIGENT TRANSPORTATION SYSTEM

CLAIM OF PRIORITY

This application is a continuation of and claims the benefit of priority under 35 U.S.C. §120 to U.S. patent application Ser. No. 12/902,012, filed Oct. 11, 2010, now U.S. Pat. No. 8,036,782, Issued Oct. 11, 2011, which is a continuation of and claims the benefit of priority under 35 U.S.C. §120 to U.S. patent application Ser. No. 11/619,941, filed Jan. 4, 2007, now U.S. Pat. No. 7,813,843, Issued Oct. 12, 2010, entitled "AD-HOC MOBILE IP NETWORK FOR INTELLIGENT TRANSPORTATION SYSTEM," which applications are hereby incorporated by reference herein in their entirety.

FIELD

The present disclosure relates generally to an intelligent transportation system.

BACKGROUND

Intelligent transportation systems aim to provide transportation networks with information and communication technologies to improve the utilization and efficiency of networks of transport, e.g., a road network. In improving the utilization and efficiency of a road network, intelligent transportation systems attempt to manage traffic and limit congestion by providing users of the road network, e.g., drivers of road vehicles, with up-to-date localized map information, traffic information etc. Managing the utilization and efficiency of a road network may further result in a safer road network, where users of the road network can take precautionary measures to limit their exposure to danger.

Various intelligent transportation systems provide for communication between a particular road vehicle using the road network, vehicles and/or roadside infrastructure in the vicinity of the particular road vehicle. The road vehicles may include a traffic management system with GPS functionality to generate data relevant to the transportation and to communicate this data with other vehicles and the roadside infrastructure. The roadside infrastructure may further communicate relevant information to specific or all road vehicles in its vicinity that forms part of the intelligent transportation system, to enable the road vehicles to use the information in an effective manner.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

Overview

A method for intelligently managing a transportation network is provided. The method may include providing a roadside apparatus to communicate with nodes associated with vehicles in a transportation network, the vehicle nodes being in a neighborhood range of the roadside apparatus. The roadside apparatus may dynamically detect the presence of a node associated with a first vehicle, and establish a mobile Internet Protocol (IP) network between the roadside apparatus and the first vehicle's node. The roadside apparatus receives, in realtime, from the first vehicle's node event data of events associated with the first vehicle over the mobile IP network.

Example Embodiments

Figure 1:
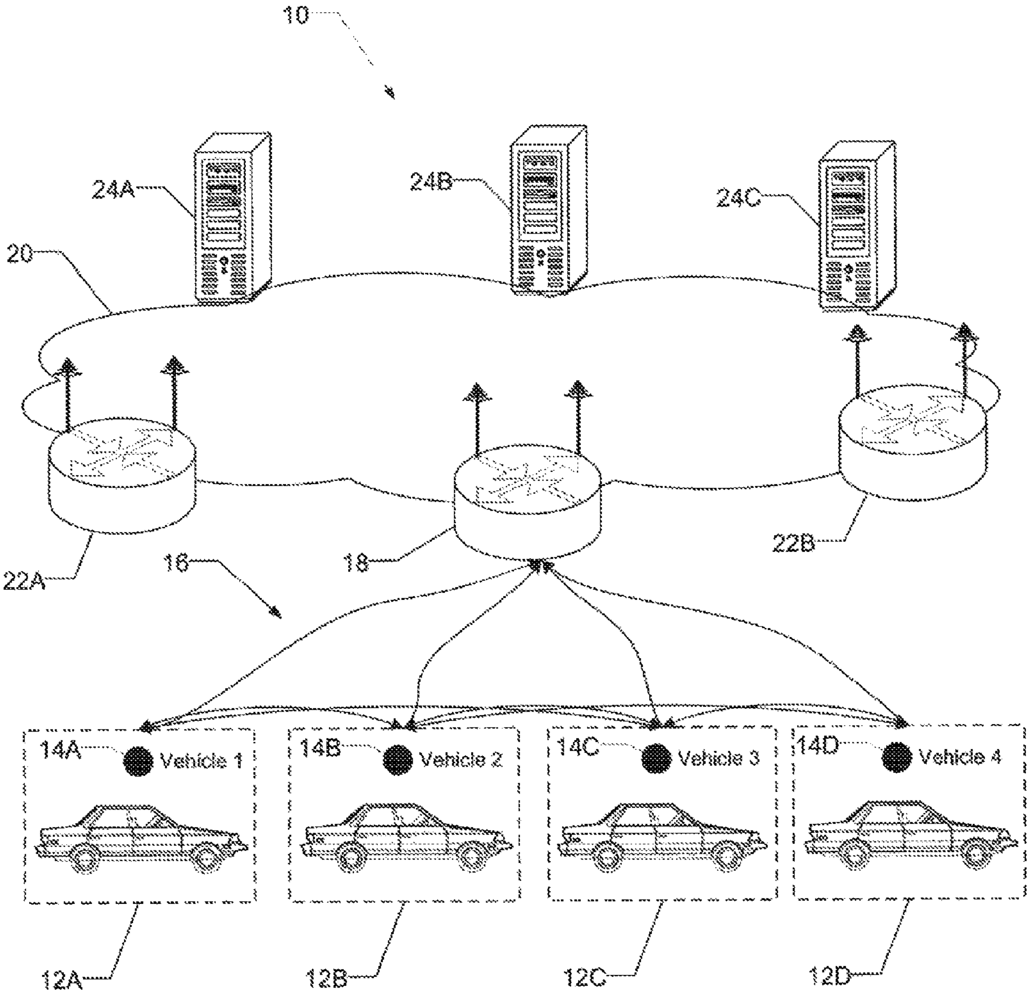
FIG. 1 shows an example of a system to intelligently manage a transportation network, in accordance with an example embodiment, that includes a wireless Internet Protocol (IP) network of nodes associated with a plurality of vehicles.

Referring to FIG. 1, reference numeral 10 generally indicates a system, in accordance with an example embodiment, to intelligently manage a transportation network.

The transportation network may be any type of transportation network. In one example embodiment, the transportation network is a network of roadways. The roadways may be highways, city streets, rural streets, suburban avenues or any other type of roadway on which vehicles are adapted to travel. However, although the embodiments are described according to a network of roadways, it will be appreciated that the transportation network may alternatively be an air traffic network, a sea transportation network or a rail transportation network.

A plurality of vehicles 12A to 12D may travel on the roadways of the transportation network. The vehicles may be any means of automated transportation, for example automobiles, such as passenger cars and Sport Utility Vehicles (SUV's), motorcycles, buses, trucks and vans.

In an example embodiment, each vehicle 12A to 12D has a respective node 14A to 14D associated with it. The vehicle nodes 14A to 14D may form a wireless Internet Protocol (IP) network 16, e.g., an IP Local Area Network (LAN), that is to be used to communicate information between the various vehicle nodes and vehicles. For example, a node 14A may actively route data to the nodes of other vehicles which may be within neighborhood range (or network interest group) of the node 14A, e.g. nodes 14B to 14D. An IP Local Area Network (LAN) may also be formed by each individual network node associated with a vehicle. In an example embodiment, information is communicated between different modules of the network node.

The neighborhood range of a node may be determined by the node of the vehicle, depending on the traffic environment in which the vehicle is traveling (e.g., the velocity of the vehicle or the number of vehicles in the vicinity of the vehicle) or preset values, or alternatively the neighborhood range may be set by the driver of the vehicle.

In an example embodiment, the nodes 14A to 14D associated with the vehicles 12A to 12D may be any type of mobile communication devices, such as mobile or cellular phones or personal digital assistants (PDA's), with specific functional capabilities that will be described in more detail below. In some embodiments WiFi or WiMax equipment may be utilized. Alternatively, any one of the vehicle nodes 14A to 14D may be a communication unit that is placed or installed in a vehicle and which may form an integral part of the vehicle, e.g., the communication unit is coupled to a vehicle computer and control system. A wireless router may be used as this communication unit. The node may alternatively comprise a combination of an in-vehicle unit and a mobile communication device, with the in-vehicle unit and mobile communication device being able to communicate with each other via an interface, e.g., serial, parallel, optical, wireless or similar interfaces.

As mentioned, the vehicles 12A to 12D are representative of vehicles that travel roadways of a transportation network. For example, vehicles 12A to 12C may travel in one direction on a highway in Utah, while vehicle 12D approaches them in the opposite direction. Depending on the vehicle's positioning in terms of each other, their respective nodes 14A to 14D may form a wireless IP LAN whenever the nodes 14A to 14D are within neighborhood range of each other, the neighborhood range being defined by the driver of the vehicle or dependent on traffic conditions.

However, it will be appreciated that the wireless IP LAN 16 may be formed as a mobile ad-hoc IP network or a mobile wireless mesh IP network. Also, it will further be appreciated that the node 14A of the vehicle 12A may, for example, communicate only with node 14B of vehicle 12B, which may in turn communicate with respective nodes 14C and 14D of vehicle 12C and vehicle 12D.

In an example embodiment, the wireless IP network 16 formed by each of the mobile wireless nodes and the combination of mobile wireless nodes 14A to 14B may further be in communication with an optional roadside apparatus 18, e.g., a wireless access server or a router. The roadside apparatus 18, in communication with any one of the vehicle nodes 14A to 14D forming part of the wireless IP network 16 may form a roadway IP wide area network WAN 20, as it may be able to communicate with other, e.g., neighboring, roadside apparatuses 22A and 22B.

The roadside IP WAN 20 may accordingly further include additional wireless roadside apparatus 22A and 22B, as well as traffic control devices, e.g., traffic control application servers 24A to 24C. The other roadside wireless apparatus 22A to 22B may be along different sections of a roadway on which vehicles may travel. For example, one roadside apparatus may be located next to a specific section of roadway, e.g., at 10 mile intervals along a stretch of highway.

Figure 2:
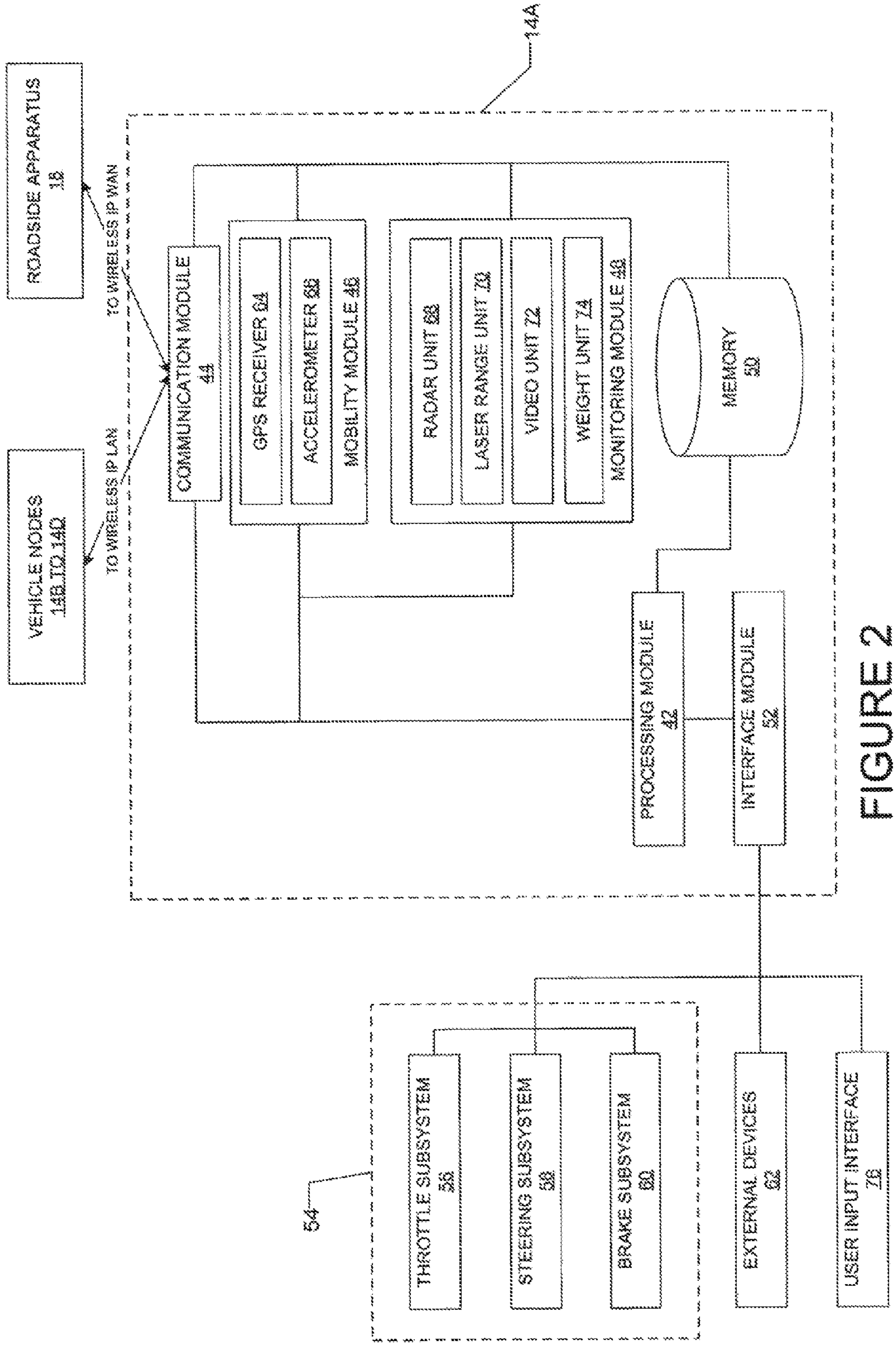
FIG. 2 shows a schematic block diagram of a node associated with a vehicle, forming part of the wireless IP network of FIG. 1, in accordance with an example embodiment.

In FIG. 2, reference numeral 14A generally indicates a vehicle node in the form of a communication unit installed in a vehicle 12A, in accordance with one example embodiment.

The node or communication unit 14A may include a processing module 42, a communication module 44, a mobility module 46, a monitoring module 48 and memory 50. The communication unit 14A may further include an interface module 52 to communicate with certain subsystems 54 of the vehicle, e.g., the throttle subsystem 56, steering subsystem 58 and brake subsystem 60. In some example embodiments the interface module 52 may also include certain interfaces and ports to communicate and interact with external devices 62, such as laptop computers or external memory devices. As mentioned, the different modules of the network node, e.g., the processing module and any one of the mobility module 46, monitoring module 48 and vehicle subsystems 54 may establish a mobile Internet Protocol (IP) network between themselves.

In an example embodiment, the communication module 44 includes a wireless receiver and wireless transmitter to receive data from and transmit data to any other wireless node 14B to 14D in neighborhood range of the communication unit 14A and associated with (e.g., installed in) a vehicle. Also, the wireless receiver and wireless transmitter of the communication module 44 may be used to receive data from and transmit data to any roadside apparatus 18 within neighborhood range of the communication unit 14A.

As mentioned, the neighborhood range of the communication module 44 may be user-defined, be dependent on preset values or existing traffic conditions, or be specified by a traffic control application server. In an example embodiment, the range of communication may depend on the quality of the receivers and transmitters and each vehicle may define the size of the neighborhood from which it wants to receive the data/information. For example, a vehicle may want to receive the information from the whole state of Utah while its transmitters and receivers can cover only devices which are within a relatively small neighborhood (e.g., 5 miles). The information from the state of Utah at large may then be propagated through the IP WAN 20 via neighboring devices. Thus relatively small neighborhoods may be defined where communications take place directly between nodes, relatively large neighborhoods may be defined where communications may be received indirectly through one or more intermediate nodes, or combinations thereof.

The communication module 44 may operate according to real-time IP audio and video wireless services technologies. In an example embodiment, data may be communicated from the communication module 44 to other vehicle nodes 14B to 14D or to any roadside apparatus 18, 22A and 22B via IP payload where the IP packet (IETF RFC-0791 or RFC-4291) is encapsulated by User Datagram Protocol (UDP) (IETF RFC-768) which in turn is encapsulated by Real-time Transport Protocol (RTP) (IETF RFC-3550) with the Secure RTP (SRTP) profile (IETF RFC-3711) which in turn is encapsulated by Wireless mobile WiFi (IEEE 802.11p), mobile WiMax (IEEE 802.16e), Wireless PAN (IEEE 802.15.4), Mobile Broadband Wireless Access (IEEE 802.20), G3.5, or a similar protocol optimized for low latency (e.g., real-time) communication in the wireless environment (e.g., a protocol suitable for voice and/or video). RTCP (also IETF RFC-3550) may be used to provide feedback on the quality of service being provided by RTP. Collectively these protocols/technologies or similar alternative protocols/technologies may provide communicable unique global addressing, identification of the interface through which data is sent, identification of the interface through which data is received, an ability to verify that data arrived intact (e.g., checksum) at a destination, packet payload type identification, packet sequence numbering, packet timestamping, delivery monitoring, packet encryption, over-the-air modulation, over-the-air interface between a wireless client (e.g., the network nodes 14A to 14B) and a base station (e.g., roadside apparatus 18) or between two wireless clients, path sharing, and security.

In an example embodiment, communication between communication module 44 and vehicle nodes 14B to 14D and the roadside apparatus 18 may be implemented as a session. In an example embodiment RTP over UDP over IP communication sessions for exchanging real-time data in either direction may be described, initiated, and controlled by a protocol resembling the ITU's H.323 or IETF's SIP and SDP. These standardized session initiation and control protocols may be used with some minor extensions (e.g. new media profiles for the new media-real-time vehicle telemetry and real-time control instructions). An example embodiment may require all of the IP session-based communications to leverage IP associated Quality of Service (QoS) mechanisms to deliver sufficient quality of service for mission critical real-time event data (e.g., sense data from the mobility module 46 or monitoring module 48) and real-time command data (e.g., control instructions) to be transmitted to the vehicle subsystems 54.

In an example embodiment, the mobility module 46 of the communication unit 14A may include a GPS receiver 64 and an accelerometer 66. In an example embodiment other devices to sense or measure other physical properties may be provided. The GPS receiver 64 may be used to determine the positioning of the vehicle 12A by providing the geographic coordinates of the vehicle 12A periodically (e.g., on a continuous basis in real-time (e.g. 50 milliseconds)). The GPS receiver 64 may further be used to determine and calculate the speed or velocity of the vehicle 12A by sampling the time and position of the vehicle periodically. It will be appreciated that the GPS receiver 64 may function independently to determine the geographic positioning and speed/velocity of the vehicle 12A, or that the mobility module 46 may be communicatively coupled (e.g., via appropriate interfaces such as Geography Markup Language (GML)) to the processing module 42 and perhaps to data sources, e.g. memory 50, so as to allow information to be passed between the modules or so as to allow the applications to share and access common data and functionalities.

The accelerometer 66 measures the acceleration of the vehicle. The acceleration of the vehicle forms part of data that may be communicated to other nodes in the neighborhood range of the communication device 14A or roadside apparatus. The accelerometer 66 may also be used to help estimate or infer the positioning or location of a vehicle, in combination with the GPS receiver 64. For example, the accelerometer 66 may be used to help estimate the location of a vehicle when the GPS receiver 64 cannot receive broadcasts from GPS satellites, e.g., when the vehicle travels in a built-up area or in a tunnel. Based on the vehicle's previous location, information on the road the vehicle is traveling on and the acceleration of the vehicle, an estimation of the location of the vehicle may be calculated.

The mobility module 46 may further be used, in an example embodiment, in combination with the processing module 42, to calculate the velocity and/or acceleration of the vehicle in specific time intervals. This information may be of particular relevance to other vehicles in the neighborhood range of the communication unit 14A and may be communicated to other vehicle nodes as warnings in the form of real-time event data.

The node or communication unit 14A may further include a monitoring module 48, a collection of sensors that monitor and sense the surrounding environment, or the like that may for example include a radar unit 68, a laser range unit 70, a video unit 72 and a weight unit 74. The radar unit 68 and video unit 72 may provide the communication unit 14A with additional data, e.g., sense data, that may also be communicated to nodes or roadside apparatus in a vehicle's neighborhood range or that may alternatively be used to assist in or improve the calculation of the location, velocity or acceleration of the vehicle. The information provided by the radar unit 68, laser range unit 70, video unit 72 and weight unit 74 may further be useful in determining an appropriate neighborhood range for the vehicle. These features may assist in the intelligent management of the transportation network.

For example, the monitoring module 48 may generate radar readings useful for the determination of direction and distance and/or velocity of other vehicles, video readings, stereo video readings for parallax calculations and Doppler readings. For example, the Japanese version of a Toyota Prius vehicle has a self-parking option which utilizes electronic sensors to measure a parking space using radar like sensors and tiny video cameras which look for white lines and the curb. The monitoring module 48 may be of higher (or equal) relevance and importance in transportation networks that do not merely relate to road networks, e.g., air, sea or rail transportation networks.

As mentioned, the monitoring module 48 may also include a weight unit 74 to measure the weight of the vehicle. The weight of the vehicle is required to calculate the momentum of the vehicle, which may in an example embodiment be included in the data communicated amongst vehicle nodes and, optionally, the roadside apparatus 18. It will be appreciated that the weight of the vehicle may affect the distance required for the vehicle in order for it to come to a complete stop.

The mobility module 46 and monitoring module 48 may, in combination or separately, function as a proximity unit to sense the proximity of other vehicles. This proximity unit may, for example, provide an accurate measurement regarding the distance between vehicles which are in the same neighborhood.

The processing module 42 may, in combination with either or both the mobility module 46 and monitoring module 48 process event or sense data further, in order for the event data to indicate a particular danger event or warning, e.g., hard breaking, traffic congestion or the like, that may be further communicated to other vehicle nodes, as discussed below. The processed event data may be transmitted to vehicle subsystems 54 as command data.

In an example embodiment, the memory 50 may be used to store data calculated or measured by the mobility module 46 and the monitoring module 48, in some example embodiments calculated or measured in combination with the processing module 42. The memory 50 may also contain data received from other vehicle nodes 14B to 14D or roadside apparatus 18. In an example embodiment, the memory 50 may also contain a map database with detailed map information for a specific geographic area. A traffic database may also form part of the memory and may include time-based traffic information for the road networks of a specific area. The memory 50 may be physically separate from the processing module and may take the form of SRAM, DRAM, FLASH RAM, magnetic storage, optical storage or any other type of memory, whether fixed or removable. A portion of the memory 50 may be non-volatile to ensure that at least some of the contents of the memory remain intact when there is no power supply to the communication unit 14A.

In one example embodiment, the processing module 42 may be a microprocessor or microcontroller capable of high speed data processing. The processing module 42 manages the data generated by the mobility module 46 and monitoring module 48 by storing the data in the memory 50 and allowing the data to be transmitted by the communication module 44 to nodes 14 and/or roadside apparatus 22 within neighborhood range. The data received via the communication module 44 from nodes and/or roadside apparatus within neighborhood range is processed by the processing module 42 and, depending on certain predefined criteria, the processing module 42 may, in an example embodiment, optionally control the vehicle by controlling the vehicle subsystems 54, e.g., the throttle subsystem 56, steering subsystem 58 and brake subsystem 60. The processing module 42 may control the subsystems 54 in response to the data received and the predefined criteria, or alternatively, the subsystems 54 may be controlled externally from the roadside apparatus 18, via the processing module 42. For example, real-time command or control data may be communicated or transmitted to the vehicle subsystems 54. This process is described by way of example in more detail below.

In one example embodiment, the communication unit 14A may include a user input interface 76 which is communicatively coupled to the interface module 52. The user input interface 76 may be used by a driver of a vehicle to activate or deactivate the communication unit 14A. The user input interface76 may also be used to predefine the neighborhood range for the vehicle's node and may additionally be used to receive a query or query answer from a driver of a vehicle. The query or query answer is then communicated to other vehicle nodes in the neighborhood range.

As described in more detail below, communications between the communication units (e.g., communication units 14A-D) may identify the type of vehicle (e.g., a make and model) in which the particular communication unit is located. As a result the roadside apparatus 18 are made aware which vehicle is e.g., motorcycle, sedan, pickup truck or an 18 wheeler truck, etc.

As mentioned, the vehicle nodes 14A to 14D may form a wireless Internet Protocol (IP) network 16, e.g., an IP Local Area Network (LAN), that is to be used to communicate information between the various vehicle nodes and vehicles. The IP LAN 16 carries real-time data sent to and received from the vehicle nodes 14B to 14D and roadside apparatus 18, but may further include real-time sense data from the mobility module 46 and real-time command data sent to subsystem 54 (e.g., throttle subsystem 56, steering subsystem 58 and brake subsystem 60). The real-time sense data and real-time command data may be contained as payload in IP packets which may in turn be encapsulated by UDP, which may in turn be encapsulated by RTP. IP associated Quality of Service (QoS) mechanisms may further be required in order to ensure that the IP LAN provides sufficient quality of service for mission critical real-time sense data and the real-time command data.

Figure 3:
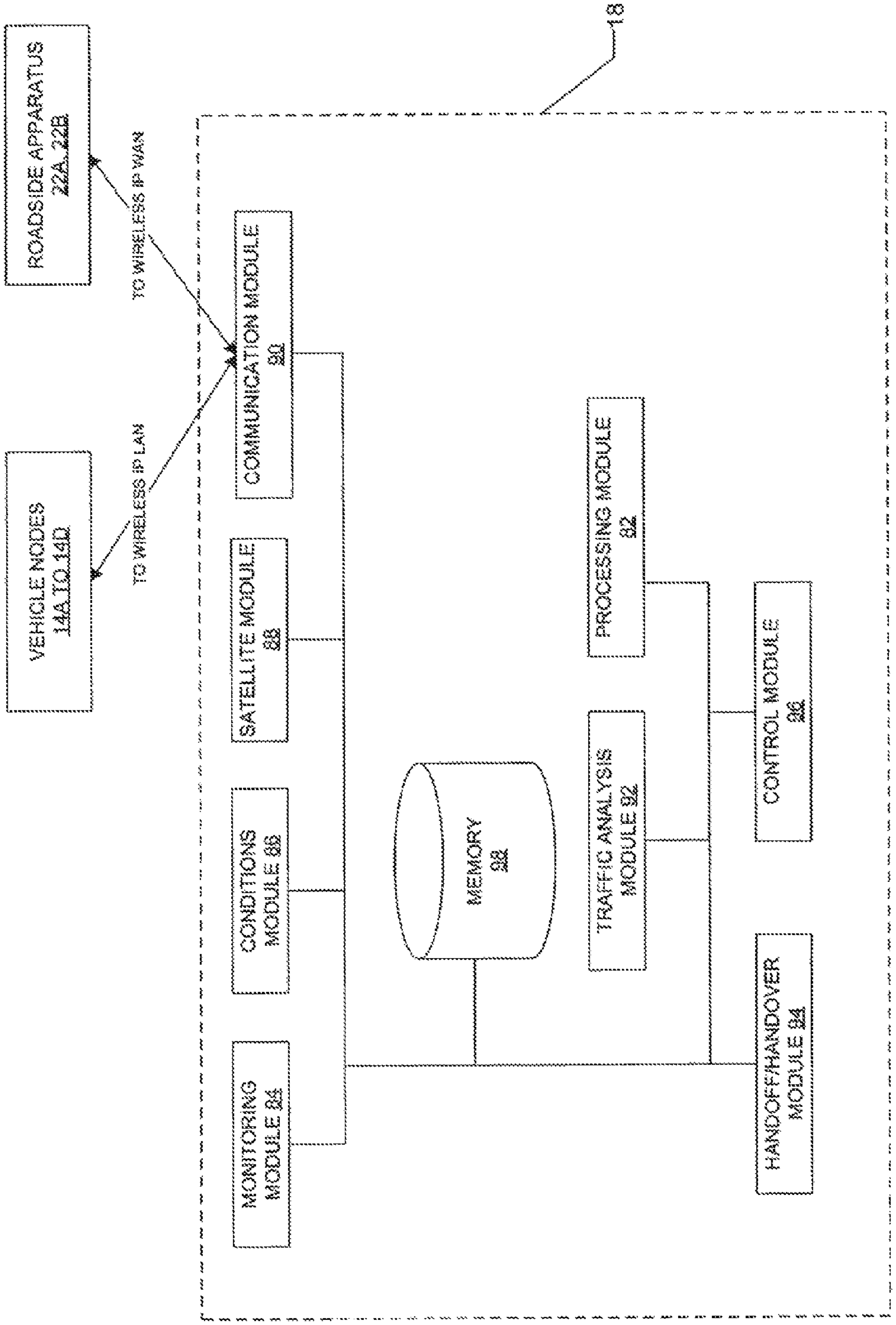
FIG. 3 shows a schematic block diagram of a roadside apparatus, forming part of the wireless IP network of FIG. 1, in accordance with an example embodiment.

FIG. 3 shows optional roadside apparatus 18, in accordance with an example embodiment. The roadside apparatus 18 may communicate with various nodes in a neighborhood range of the roadside apparatus 18 and, in certain circumstances, control vehicles 12A to 12D with associated nodes 14A to 14D. As mentioned, example embodiments of a roadside apparatus include a wireless access server or a wireless router.

The roadside apparatus 18 may include a processing module 82, a monitoring module 84, a conditions module 86, a satellite module 88 and a communication module 90. In an example embodiment, the roadside apparatus 18 may also include a traffic analysis module 92, a handoff/handover module 94, a control module 96 and memory 98. The modules may themselves be communicatively coupled (e.g., via appropriate interfaces) to each other and to various data sources, (e.g. memory 98) so as to allow information to be passed between the modules or so as to allow applications to share and access common data and functionalities.

The processing module 82 may be a one or more microprocessors or microcontrollers capable of high speed data processing. The processing module 82 may manage and in some instances generate, data stored or generated by other modules or the memory of the roadside apparatus 18 (or both the roadside apparatus 18 and vehicle nodes 14). The control module 96 may in addition manage or control vehicles in communication with it, which may or may not form part of a platoon (or subset of vehicles), but with associated and/or installed nodes within a neighborhood range defined by the roadside apparatus 18. For example, the communication module 90 may transmit command data generated by the control module 96 to the various nodes, thereby to control the subsystems 54 of the node. The neighborhood range of the roadside apparatus 18 may in some example embodiments be preset to a particular geographic area. The neighborhood range may alternatively be dependent on preset values or existing traffic conditions, or be specified by a traffic control application server. In some embodiment a single roadside apparatus 18 may form and control multiple subsets of vehicles.

In an example embodiment, the monitoring module 84 may include a distance and speed measurement equipment such as radar or laser based equipment and a video unit. The term "radar" as referred to herein is intended to include radio based as well as non-radio based distance and velocity measurement apparatus. The radar and video units may provide the roadside apparatus 18 with data that may be communicated to other vehicle nodes or roadside apparatus in the neighborhood range of the roadside apparatus 18. This information may additionally be used in combination with data received from vehicle nodes or roadside apparatus to assist in or improve the calculation of the location, velocity or acceleration of vehicle in particular sections of the transportation network, thereby to assist in the intelligent management of the transportation network.

For example, the radar unit of the monitoring module 84 may generate radar readings and Doppler readings that may be useful in the determination of direction and distance and/or velocity of vehicles in neighborhood range of the roadside apparatus 18. Video readings may be generated by the video unit and stereo video readings may be used for parallax calculations that may be applicable to vehicles traveling within neighborhood range of the roadside apparatus. As mentioned above, it will be appreciated that the monitoring module 48 may be useful in transportation networks that do not merely relate to road networks, e.g., air, sea or rail transportation networks.

In an example embodiment, the conditions module 86 of the roadside apparatus 18 may be responsible for updating and maintaining data records relating to road and weather conditions. The road and weather conditions data may be stored in the memory 98. It will be appreciated that the road conditions data may be obtainable from local road authorities responsible for the improvement and maintenance of the road networks in the area in which the roadside apparatus 18 is located. The weather conditions data may be obtainable from an external source, such as a weather bureau or from websites that keep an up to date record of existing weather conditions in the area in which the roadside apparatus 18 is located.

The satellite module 88 may be used to communicate data/information in certain circumstances. For example, the satellite module 88 may be used when other communications means are not available. For example, cellular communication, line of sight communication, or just Wifi, WiMax, or wireline communication may primarily be used to communicate between adjacent or proximate roadside stations. The satellite module 88 may also process satellite telemetry (e.g. video) as an additional source of data for detecting traffic congestion."

In an example embodiment, the communication module 90 may include a wireless receiver and wireless transmitter to receive data from and transmit data to wireless nodes 14A to 14D within a neighborhood range of the roadside apparatus 18, the nodes being respectively associated with (e.g., installed in) vehicles 12A to 12D. The wireless receiver and wireless transmitter of the communication module 90 may further be used to receive data from and transmit data to any other roadside apparatus 22A and 22B within the neighborhood range of the roadside apparatus 18.

The communication module 90 may operate utilizing any low latency protocol such as real-time IP audio and video wireless services technology. For example, data may be communicated from the communication module 90 to other nodes or to any roadside apparatus 22A and 22B via the Transport Control Protocol/Internet Protocol (TCP/IP), User Datagram Protocol (UDP), Real-time Transport Protocol (RTP), Secure RTP (SRTP), Real-Time Transport Control Protocol (RTCP) or a similar protocol optimized for the wireless environment.

In an example embodiment, the memory 98 stores data received from nodes 14A to 14D or other roadside apparatus 22A and 22B within neighborhood range on the roadside apparatus 18. The data stored may include the type of each vehicle in the subset of vehicles, e.g., motorcycle, sedan, truck, etc., as well as events data, e.g., the velocity, acceleration, radar data, video data or laser range distance data relating to any nearby vehicle node forming part of the mobile IP network, momentum, weight, geographic coordinates of a particular vehicle, stored in combination with an associated time reference. The memory may also include a map database with detailed map information for the specific geographical area of the roadside apparatus. A traffic database may also form part of the memory and may include historical time-based traffic information for the road networks of a specific area. The memory 98 may be physically separate from other modules (e.g., the processing module 82 and the traffic analysis module 92) and may take the form of SRAM, DRAM, FLASH RAM, magnetic storage, optical storage or any other type of memory, whether fixed or removable. A portion of the memory may be non-volatile to ensure that at least some of the contents of the memory remain intact when there is no power supply to the roadside apparatus 18. In one embodiment the system may utilize off-site or remote memory over the network such as Storage Area Network (SAN).

The traffic analysis module 92 may process data received from nodes 14A to 14D or other roadside apparatus 22A and 22B within the neighborhood range of the roadside apparatus 18 as well as information from its own local sensors. As mentioned, this data may be stored in the memory 98. The traffic analysis module 92 may also manage the received data in combination with the data held in the traffic and map databases of the memory 98. Based on the processing of the data received from other nodes 14A to 14D and/or roadside apparatus 22A and 22B in neighborhood range of the roadside apparatus 18, the traffic analysis module 92 may determine that communications or broadcasts have to be sent to vehicle nodes or roadside apparatus within neighborhood range. Also, based on the processing of data by the traffic analysis module 92, instructions (e.g., command data) may be given to the control module 96 to take further action.

In an example embodiment, the handoff/handover module 94 is responsible for the handover of any vehicle nodes 14A to 14D in neighborhood range of the roadside apparatus 18 to a neighboring roadside apparatus, e.g., roadside apparatus 22A and 22B. In this context, handoff or handover refers to a process of transferring a data session from one roadside apparatus to a neighboring roadside apparatus. As vehicle nodes 14A to 14D may be mobile to various degrees, depending on the traffic congestion in a specific area, a vehicle node may move out of the neighborhood range of one roadside apparatus and may move into the neighborhood range of another roadside apparatus that provides it with a stronger communication link. Hard handoff or "break before make" handoffs where the connection with the previous roadside apparatus is disconnected before connecting to the neighboring roadside apparatus may be used. Alternatively, soft handoff where the connection with the previous roadside apparatus is not disconnected until a connection with the new roadside apparatus is made may be used.

In accordance with one example embodiment, the roadside apparatus 18 may use the location and direction in which each vehicle is traveling to determine and predict the next neighborhood into which a specific vehicle is about to join. The roadside apparatus 18 may then use this information to update the next neighborhood roadside apparatus about the vehicle which is about to join its sphere of control. This may allow the roadside apparatus 18 to start transferring information to its neighbor roadside apparatus and facilitate the soft transfer of control amongst them.

The control module 96 may be used to control a group of vehicles within the neighborhood range of the roadside server 18, in combination with the traffic analysis module 92. This group of vehicles may be called a platoon, indicating that the vehicles may move in a similar fashion. The control module 96 may provide instructions, in the form of command data, that are transmitted by the communication module 90, to vehicle nodes in the platoon, with the instructions directed to controlling the vehicle subsystems 54, e.g., the throttle subsystem 56, steering subsystem 58 and brake subsystem 60 of vehicle node 14A. In one embodiment the system may offer the drivers of the various vehicles driving suggestions rather than control the vehicle. For example, the system may suggest to a driver who is approaching a junction in the road to move to the left lane and free up the right lane to facilitate merging traffic from the merging road.

In another example embodiment, the driving instructions to the subsystem 54 (shown in FIG. 2 to include the throttle subsystem 56, steering subsystem 58, and brake subsystem 60) may be of a continuous, real-time basis regardless of whether these instructions come from the control module 96 of the roadside apparatus 18 or the vehicle's own processing module 42. As a vehicle is turning, the steering subsystem 58 may, for example, be given many adjustment instructions, in real-time, every second for the life of the turn. When the vehicle is directed to increase its speed, the throttle subsystem 56 may continuously feed instructions, in real-time, many times a second. Likewise, when braking, the brake subsystem 60 may continuously feed instructions, in real-time, many times a second to increase or decrease the level of braking.

In an example embodiment, these instructions may resemble a human driver driving a vehicle. For example, when turning, the driver gradually turns the steering wheel and then gradually straightens the steering wheel when the turn is complete. Also, when the driver accelerates, the driver gradually pushes down on the accelerator's pedal. Similarly, when the driver slows down, the driver may gradually take his foot off the accelerator or may totally remove it before pushing down on the brake. This may be done by first pushing hard on the brake and then gradually releasing the pressure on the brake as the vehicle slows down. As mentioned, instructions from an automated driver may operate in a similar fashion.

In an example embodiment, instructions may be transmitted from the communication module 90 many times a second by way of IP packets. For example, an instruction may reduce throttle by 5% and turn the vehicle by 3 degrees. A 100 milliseconds later a further instruction may decrease the throttle by another 5% and turn the vehicle yet another 3 degrees. Alternatively, an instruction may be generated every 300 milliseconds, with each instruction decreasing the throttle by 15% over the next 300 milliseconds and turning the wheel an additional 9 degrees over the next 300 milliseconds.

Figure 4:
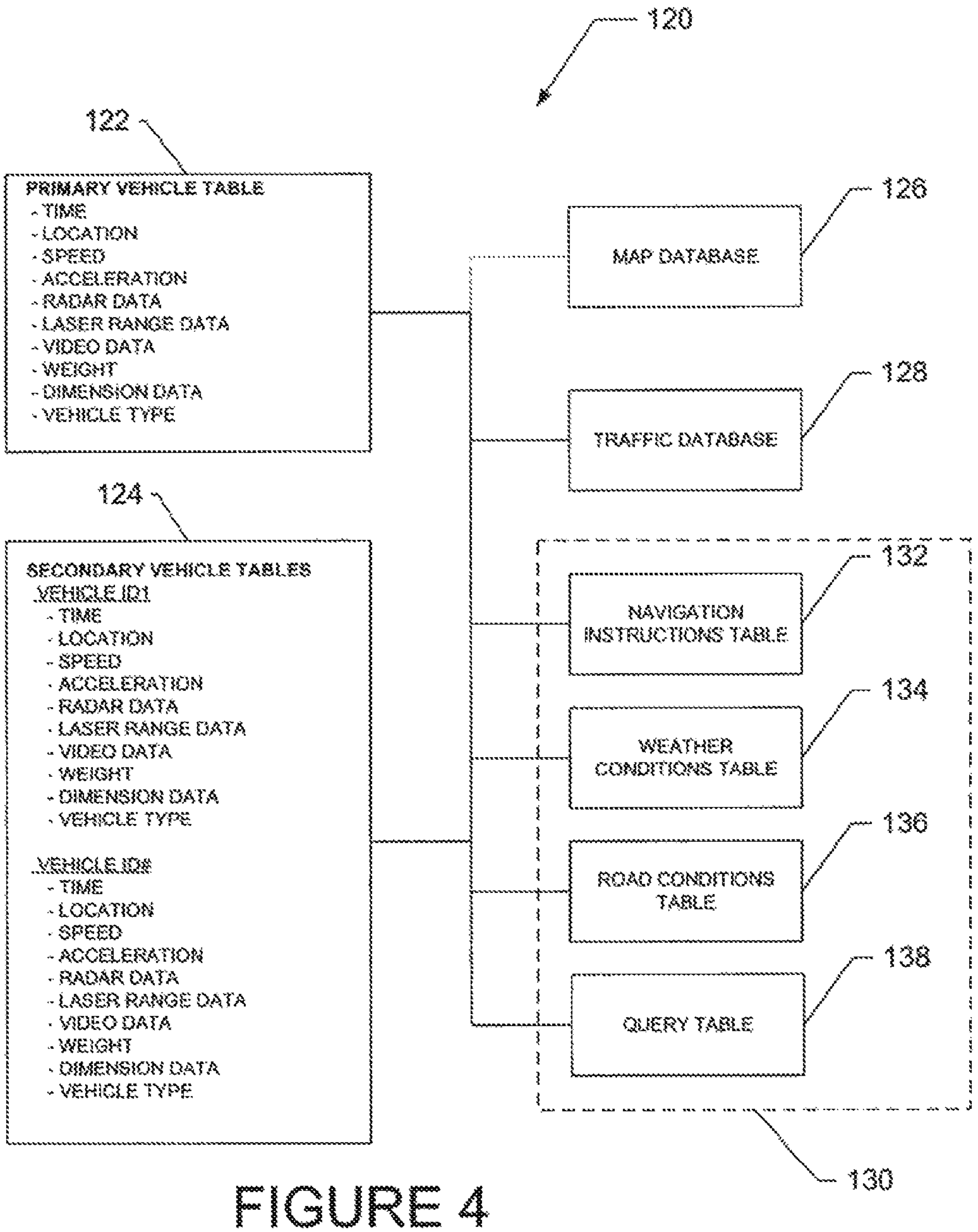
FIG. 4 shows a high-level entity-relationship diagram illustrating tables and databases that may be maintained within a memory of an example node associated with a vehicle, in accordance with an example embodiment.

FIG. 4 is a high-level entity-relationship diagram, illustrating various tables and databases 120 that may be maintained within a memory of an example node associated with a vehicle, e.g., node or communication unit 14A associated with vehicle 12A, and that are utilized by and support the modules of communication unit 14A.

A primary vehicle table 122 may contain data relating to physical properties of the vehicle 12A associated with the node 14A. For example, geographical location data of the vehicle, the velocity of the vehicle, the acceleration of the vehicle, the vehicle type, e.g., motorcycle, sedan, truck, radar data, video data or laser range distance data relating to any nearby vehicle node forming part of the mobile IP network and the weight of the vehicle may be stored in combination with a time reference. The primary vehicle table 122 may optionally include dimension data that, for example, provides details of the physical size and shape of the vehicle so that it may be determined to what degree the vehicle may obstruct the field of view of a driver of another vehicle. This information may also be determined from the vehicle type.

Similarly, a secondary vehicle table 124 may contain data relating to physical properties of vehicles 12B to 12D associated with respective vehicle nodes 14B to 14D. These vehicle nodes 14B to 14D may be in neighborhood range of the vehicle node 14A, in neighborhood range of a roadside apparatus 18 or may alternatively form part of a wireless IP LAN formed by some of the vehicle nodes 14A to 14D. For example, for each vehicle a vehicle identification number may be stored with the geographical location data of the vehicle, the velocity of the vehicle, the acceleration of the vehicle, radar data, video data or laser range distance data relating to any nearby vehicle node forming part of the mobile IP network and the weight of the vehicle, the vehicle type, e.g., motorcycle, sedan, truck, and may be associated with a time reference. As in the case of the primary vehicle table 122, the secondary vehicle table 124 may optionally include dimension data.

The tables and databases 120 may further include a map database 126 which contains detailed map information for a specific geographical area, a traffic database 128 containing historical time-based traffic information of the road networks of a specific area and relay data tables 130. The relay data tables 130 may include a navigation table 132, a weather conditions table 134, a road conditions table 136 and a query table 138. The data contained in the relay data tables may be received, in an example embodiment, from a roadside apparatus in neighborhood range of the vehicle node 14A, and may be communicated to other vehicle nodes 14B to 14D on an ad-hoc basis. The query table may include queries received from other vehicle nodes, submitted by the driver of the particular vehicle. These queries will be broadcast across the mobile IP network until a query answer is received (and relayed to other vehicle nodes open to query information).

Figure 5:
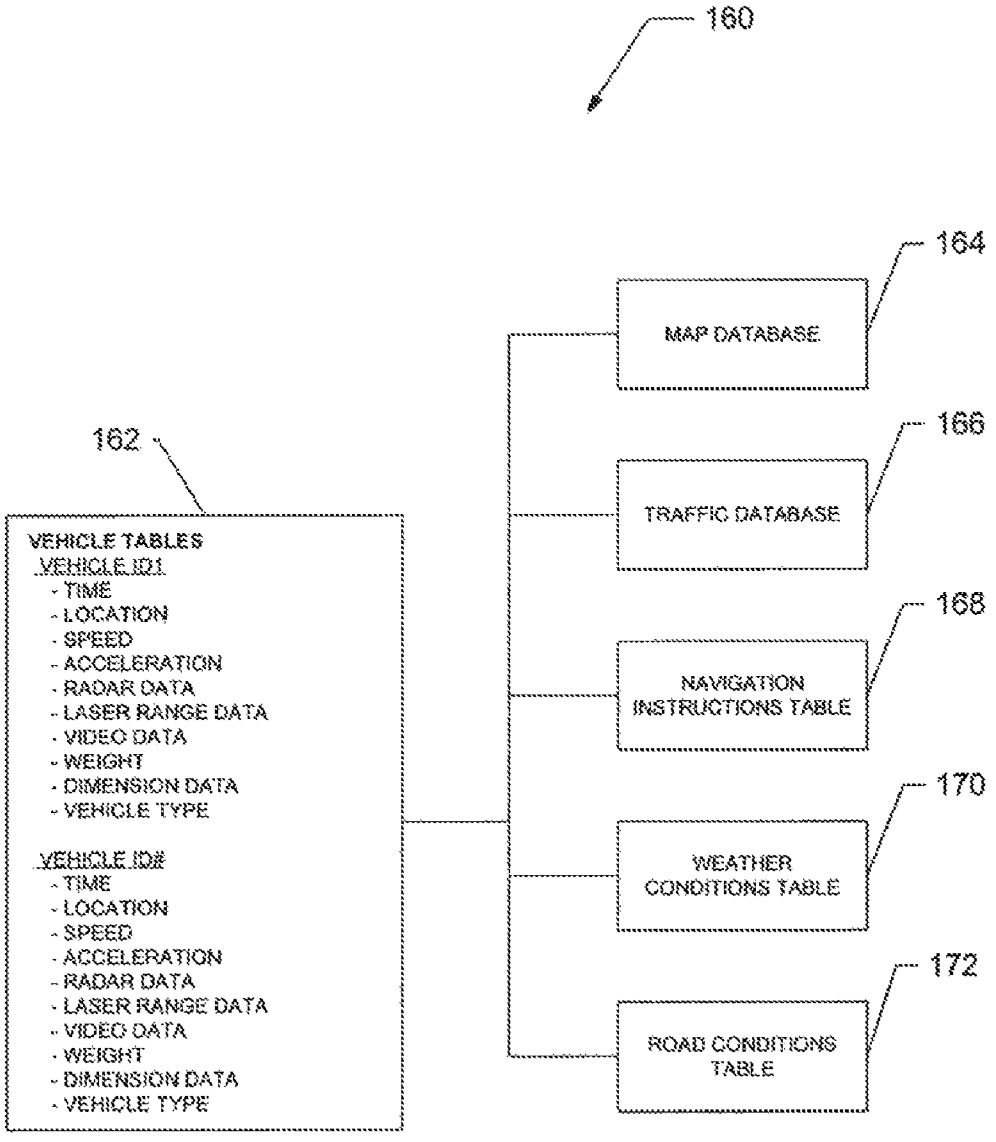
FIG. 5 shows a high-level entity-relationship diagram illustrating tables and databases that may be maintained within a memory of an example roadside apparatus, in accordance with an example embodiment.

FIG. 5 shows a high-level entity-relationship diagram illustrating tables and databases 160 that may be maintained within a memory of an example roadside apparatus, e.g., roadside apparatus 18, in accordance with an example embodiment.

Vehicle tables 162 may contain data relating to physical properties of vehicles 12A to 12D associated with respective vehicle nodes 14B to 14D. These vehicle nodes 14A to 14D may be in neighborhood range of the roadside apparatus 18 or may alternatively form part of a wireless IP LAN formed by some of the vehicle nodes 14A to 14D, with one of the vehicles being in neighborhood range of the roadside apparatus. For example, for each vehicle a vehicle identification number may be stored with the geographical location data of the vehicle, the velocity of the vehicle, the acceleration of the vehicle, radar data, video data or laser range distance data relating to any nearby vehicle node forming part of the mobile IP network, vehicle type, e.g., motorcycle, sedan, truck, and the weight of the vehicle. This data may be stored with an associated time reference.

The tables and databases 160 may further include a map database 164, a traffic database 166, a navigation instructions table 168, a weather conditions table 170 and a road conditions table 172. The map database 164 may contain detailed map information for a specific geographical area associated with the roadside apparatus 18, while the traffic database 128 may contain historical time-based traffic information on the road networks associated with the roadside apparatus. As mentioned above, the weather conditions table 170 and the road conditions table 172 may be managed by the conditions module 86 of the roadside apparatus 18 and may be updated from external sources.

As mentioned above, and as will be described in more detail below, data, in particular event data and query data, is communicated between the different communication modules 44 of the vehicle nodes 14A to 14D within a particular neighborhood range, and also between a communication module 44 of a vehicle nodes 14A to 14D and, optionally, a communication module 90 of a roadside apparatus 18. The vehicle nodes 14A to 14D and the roadside servers 18, 22A and 22B may form a number of wireless IP networks, e.g., wireless ad-hoc or mesh LANs or WANs. Data may be communicated between the vehicle nodes and roadside apparatus via the TCP/IP, UDP, Real-time Transport Protocol (RTP), Secure RTP (SRTP), Real-Time Transport Control Protocol (RTCP) or a similar protocol optimized for the wireless environment.

The event data, which may be physical properties such as geographical location, velocity, acceleration, rate of acceleration or de-acceleration, radar data, video data or laser range distance data relating to any nearby vehicle node forming part of the mobile IP network, the type of each vehicle in the subset of vehicles (e.g., motorcycle, sedan, truck, etc.), momentum or weight, may optionally be housed in a location object within a Presence Information Data Format (PIDF) document, with the PIDF reference by a specified RTP profile. The PIDF document as specified by the IETF RFC-4119 may be expanded to house all of the aforementioned and similar physical properties. Unlike the original intention for PIDF documents, the modified PIDF document may be transmitted in continuous real-time basis (e.g. every so many 10s or 100s of milliseconds). Alternatively, the event data may be communicated in a similar fashion to normal Voice or Voice over IP calls via the wireless network.

In order to ensure sufficient data sharing between the vehicle nodes and roadside apparatus, the vehicle nodes may be required to sample or generate the relevant data, as well as communicate this event data, at intervals of 10 to 100 milliseconds.

In one example embodiment, the system may continuously sample and analyze the data to determine if the vehicle may be in entering into a danger zone wherein the safety of the people in the vehicle may be at risk. In order to determine this condition the system may factor in the distance and accelerations from the radar systems onboard the set of vehicles as well as the road conditions. In response to continuously sampling and analyzing data, command data may be generated to be transmitted to subsystems of the vehicles, thereby to control them.

Figure 6:
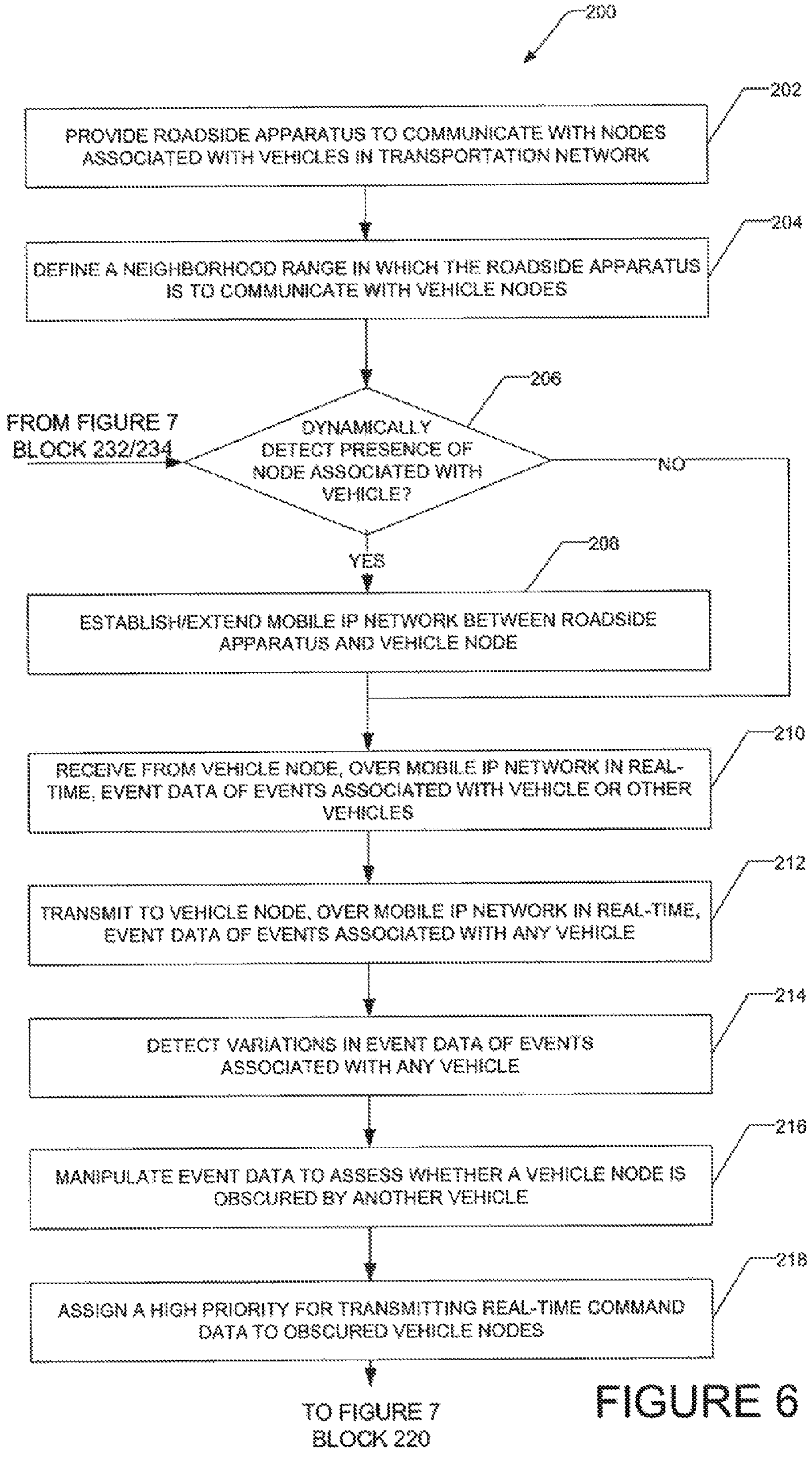
FIGS. 6 and 7 show an example of a method, in accordance with an example embodiment, for intelligently managing a transportation network.
Figure 7:
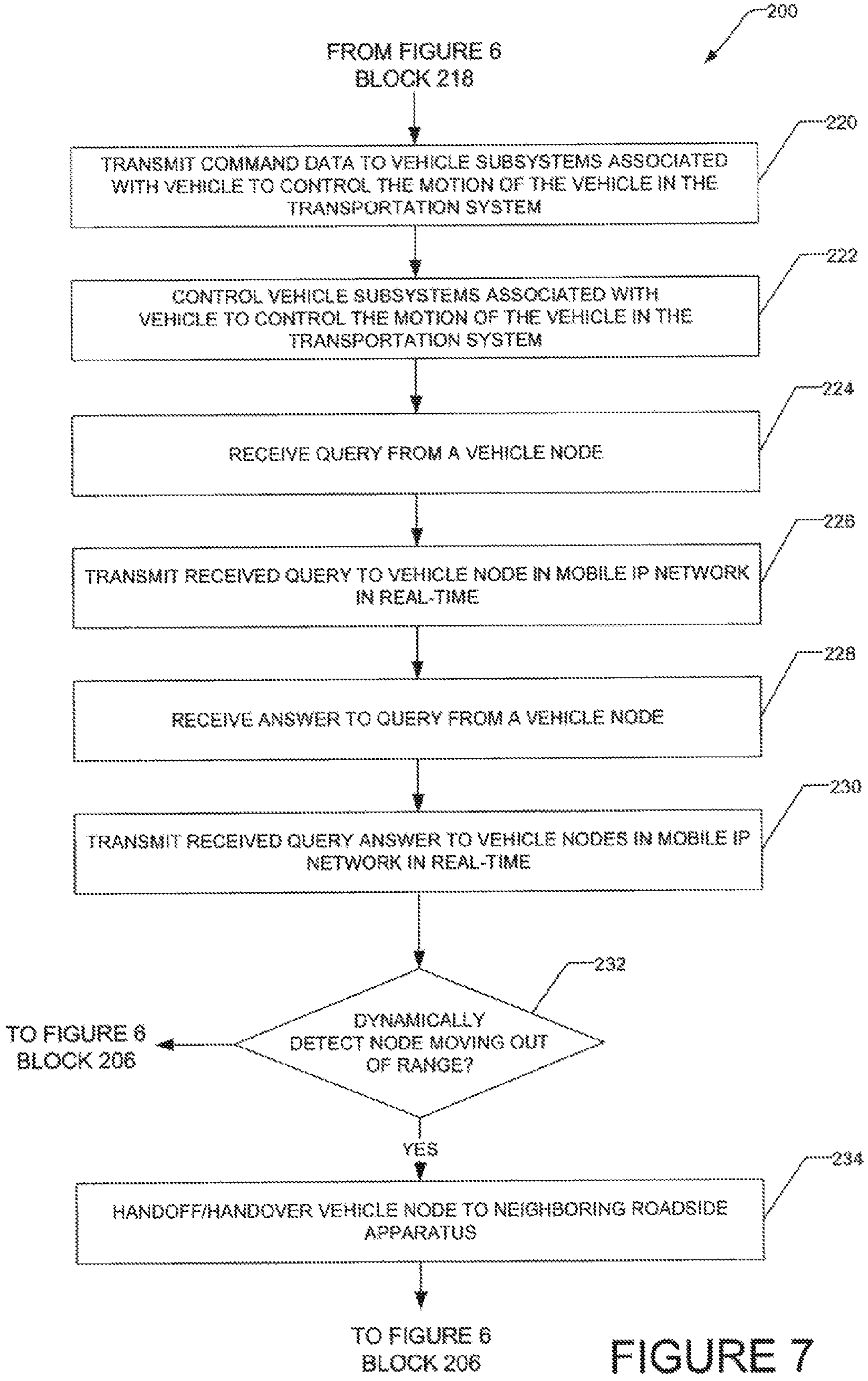

FIGS. 6 and 7 show a flow diagram of a method 200, in accordance with an example embodiment, for intelligently managing a transportation system in which the transportation system includes a number of vehicles 12A to 12D with nodes 14A to 14D respectively associated with each vehicle. The vehicle nodes form, with roadside servers 18, 22A and 22B a wireless IP network, e.g., a wireless mesh or ad-hoc IP network.

As shown by block 202, a roadside apparatus 18 is provided to communicate with nodes 14A to 14D associated with vehicles 12A to 12D in a transportation network. As mentioned, in one example embodiment the transportation network is a network of roadways on which the vehicles 12A to 12D travel. A neighborhood range is defined in block 204. The neighborhood range specifies the area or range in which the roadside apparatus 18 is to communicate with vehicle nodes 14A to 14D. For example, it may be defined that a roadside apparatus 18 is to communicate information and data, e.g., event data relating to vehicles, road and weather condition data or query data, to vehicle nodes 14A to 14D in a radius of 6 miles from the roadside apparatus 18. If roadside apparatus 22A and 22B are neighbors of roadside apparatus 18, each being 10 miles from roadside apparatus 18, the roadside apparatus 18, 22A and 22B may provide good coverage to approximately a 32 miles stretch of roadway.

As shown by block 206, the roadside apparatus 18 may dynamically detect the presence of a node, e.g., vehicle node 14A, associated with a vehicle 12A. This detection may occur by receiving a probe signal or any other data signal from the vehicle node 14A. In the event that a vehicle node has been detected, a mobile IP network may be established between the roadside apparatus 18 and the vehicle node 14A (block 208).

The roadside apparatus 18, may now, as shown in block 210, receive from the vehicle node or nodes that have been detected, event data of events associated with a vehicle or other vehicles in the neighborhood range of the roadside apparatus 18. As is described in other parts of the document, the event data received may be sampled or generated on a continuous basis by various vehicle nodes 14A to 14D, the event data either being communicated directly to the roadside apparatus 18 or being communicated via other vehicle nodes, over a wireless mesh or ad-hoc IP network, to the roadside apparatus 18. The event data may include geographical location data of a vehicle, the vehicle velocity, acceleration, the type of each vehicle in the subset of vehicles, e.g., motorcycle, sedan, truck, etc., radar data, video data or laser range distance data relating to any nearby vehicle node forming part of the mobile IP network momentum and weight, in combination with a time reference. The time reference may be either a specific time instant or time period. The event data received from the vehicle nodes may further include data that has already been processed by the vehicle nodes. In these circumstances, the event data may indicate a particular danger event or warning, e.g., hard breaking, traffic congestion or the like.

Once the event data is received over the established mobile IP network in real-time, the roadside apparatus 18 may transmit (as shown in block 212) the event data to other vehicle nodes in the neighborhood range. This transmittal of data may also be in real-time over the established mobile IP network. In some example embodiment the roadside apparatus is not present and the vehicles may establish a mesh network amongst themselves and communicate the information directly between the vehicles. In another example embodiment, the system establishes and manages multiple vehicle sets within its communication neighborhood. A vehicle set may be defined as a collection of vehicles which are within proximity of e.g., less than 50 meters from each other. The distance of vehicles within a vehicle set may be a function of the speed in which the vehicles travel and the associated road conditions.

In an example embodiment, the roadside apparatus may detect variations in event data of events associated with any vehicle (shown by block 214) and may use the analyzed data to control vehicles. For example, and as shown by block 216, the monitoring module 84 in combination with the control module 96 may manipulate event data to assess whether a vehicle node is obscured by another vehicle. If a vehicle node is obscured by another vehicle, the control module 96 may assign a high priority for transmitting real-time command data to the obscured vehicle node (block 218). For example, the control module 96 may assign a high priority for transmitting real-time data directed to the brake subsystem of any vehicle.

In some example embodiments, the vehicle nodes may not first process the event data to enable the event data to specifically indicate a particular danger event or warning. In these circumstances it may be up to the roadside apparatus 18 to process the event data received from the vehicle nodes (e.g., the velocity, acceleration, geographical location) and to detect and calculate any variations in the received event data. The calculated variations may in some embodiments be communicated to vehicle nodes as command data (shown by block 220 of FIG. 7) to enable the vehicles associated with the nodes to take cautionary action or alternatively, and as shown in block 222, in response to the calculated variations, the roadside apparatus 18 may directly control vehicle subsystems associated with vehicles in the neighborhood range of the roadside apparatus 18. By directly controlling the subsystems of vehicles in the neighborhood range, the motion of vehicles in sections of the transportation network may be managed and controlled.

This controlling functionality of the roadside apparatus may be used by authorities to particularly control traffic in a transportation system in severe traffic conditions.

In other example embodiments, a user input interface may be used by drivers of vehicles to send a query to other vehicles. These queries may for example relate to the cause of traffic congestions. In block 224, the roadside apparatus 18 receives this query from a vehicle node, either directly from the vehicle from which the query originated, or via other vehicle nodes forming part of the mobile IP network.

The roadside apparatus 18 may transmit, in real-time and as shown in block 226, the received query to other vehicle nodes in the mobile IP network. The driver of a vehicle that may know the answer to a query that has been received by the vehicle node associated with the driver's vehicle may respond to the query by submitting an answer via the vehicle node's user input interface. As shown in block 228, the roadside apparatus receives the answer to the query from a vehicle node. Similar to the description above, the query answer may be received directly from the vehicle node from which the answer originated, or it may be received via other vehicle nodes.

The roadside apparatus now transmits (block 230) the received query answers to other vehicle nodes in real-time, over the mobile IP network. In a related example embodiment, drivers may post messages for each other and associate these messages with, for example, a specific geographical location. For example, if a driver detects an obstruction (e.g., a box) on the highway, he may post a message for all other cars which are driving in the same direction alerting them of the road hazard which lies ahead.

As the vehicles with nodes in the neighborhood range of the roadside apparatus 18, which forms part of the mobile IP network, may be traveling at different speeds in the transportation network, it is necessary to handoff or handover vehicles moving out of the neighborhood range to adjacent or neighboring roadside apparatus. As shown in block 232, the roadside apparatus 18 dynamically detects when a node is moving out of the neighborhood range. When this happens the roadside apparatus may handoff/handover the vehicle node to a neighboring roadside apparatus 22A and 22B (block 234).

The operations described according to the example embodiment of FIGS. 6 and 7 may be repeated, with the roadside apparatus detecting, on an ongoing basis, whether new vehicle nodes associated with other vehicles are within the neighborhood range of the roadside apparatus (FIG. 6, block 206). Although FIGS. 6 and 7 describe communication between vehicles via a roadside apparatus, it should be understood that this communication may take place as direct communication between the vehicles once they establish an ad-hoc mesh network amongst themselves.

Figure 8:
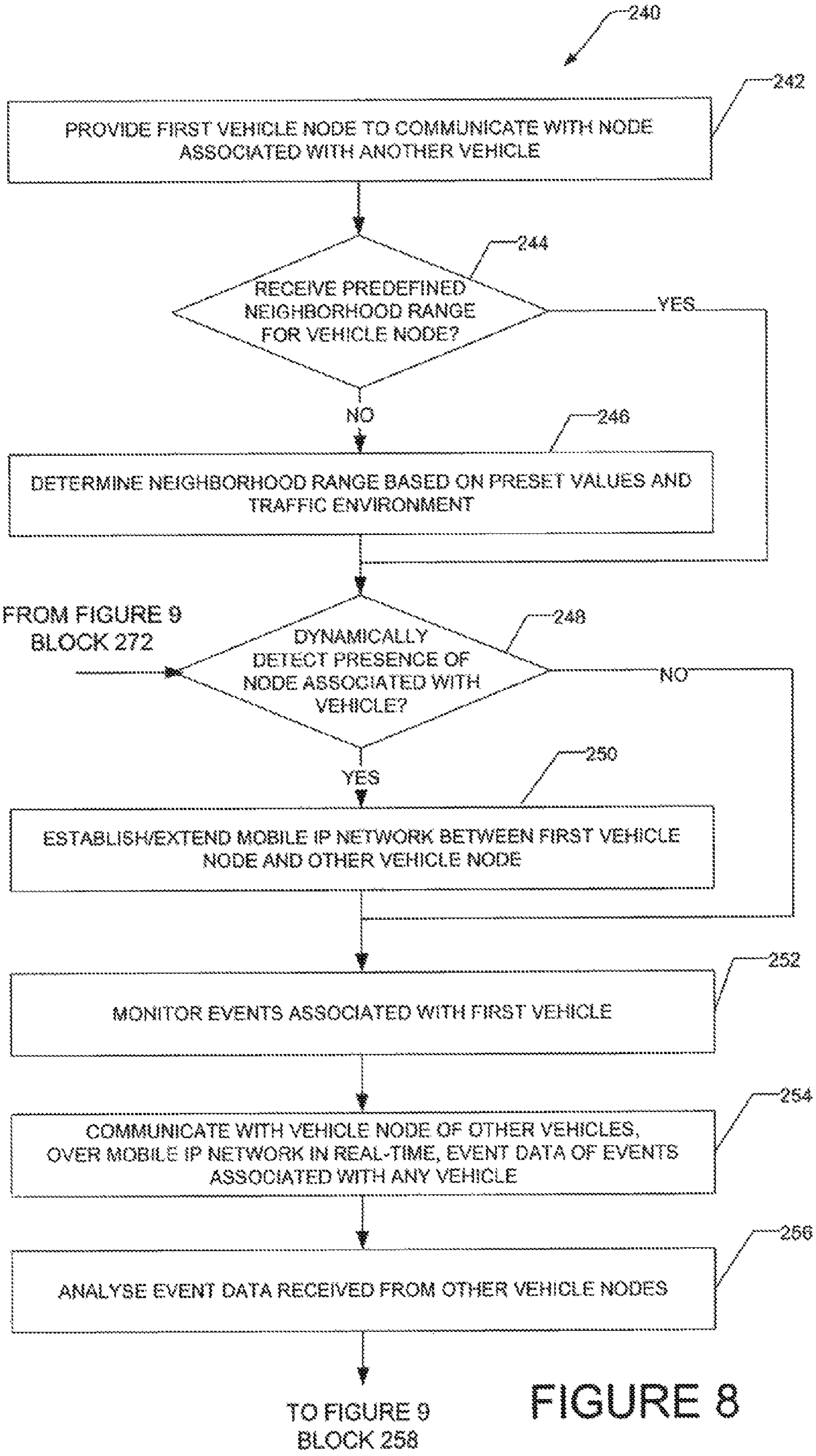
FIGS. 8 and 9 show another example of a method, in accordance with a further example embodiment, for intelligently managing a transportation network.
Figure 9:
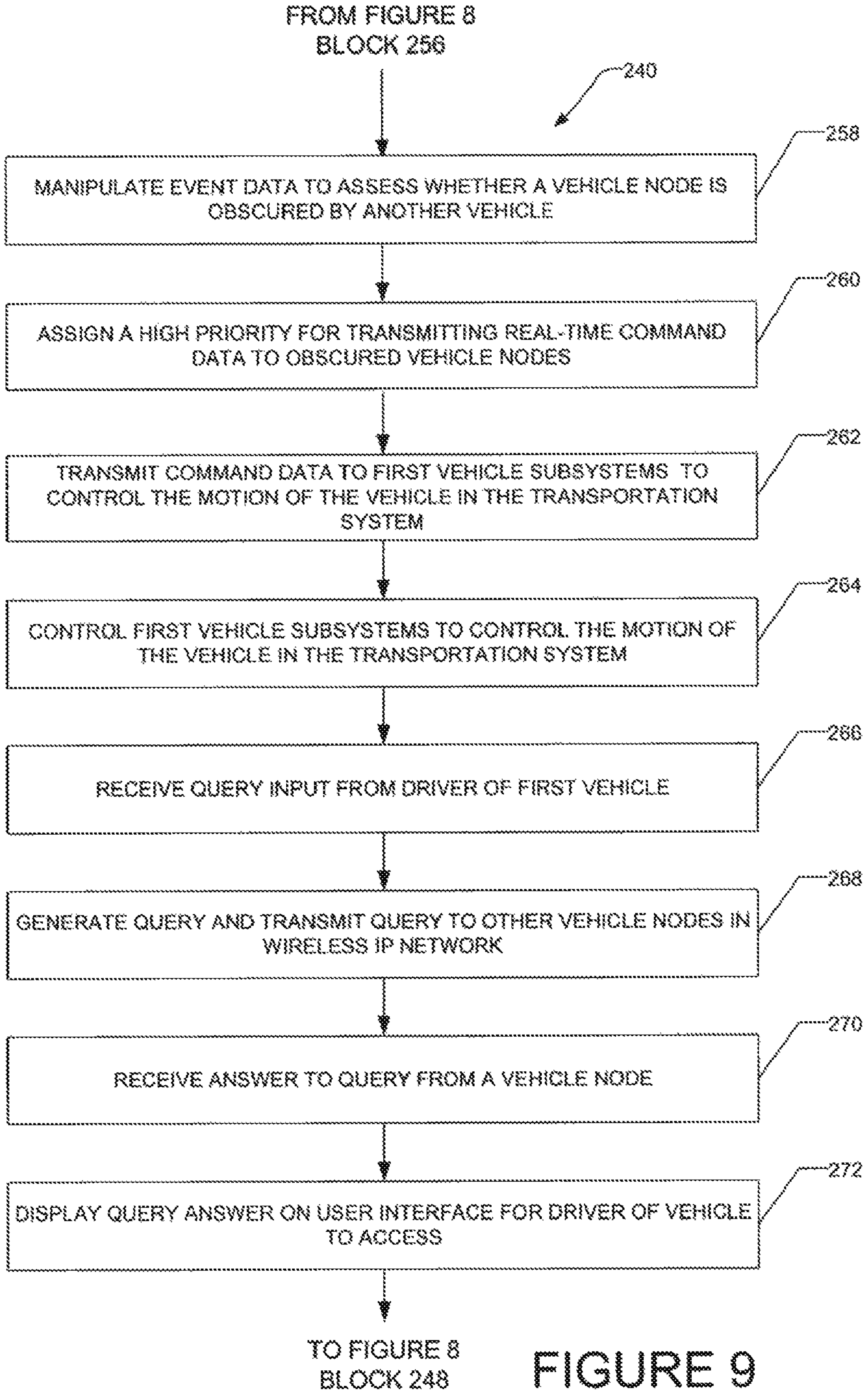

FIGS. 8 and 9 show a flow diagram of a further example method 240, in accordance with another example embodiment, for intelligently managing a transportation system in which the transportation system includes a number of vehicles 12A to 12D with a node 14A to 14D associated with each vehicle. The vehicle nodes form a wireless IP network, e.g., a wireless mesh or ad-hoc IP network.

As shown in block 242, a vehicle node 14A associated with a first vehicle 12A is provided, the first vehicle node 14A to communicate with other nodes 14B to 14D associated with other vehicles 12B to 12D. The vehicle node 14A verifies whether a predefined neighborhood range has been received for the vehicle node (block 244). For example, a predefined neighborhood range may be driver defined by the driver of the vehicle associated with the vehicle inputting the neighborhood range with a user input interface. The driver may for example either define the speed at which the vehicle is traveling, may define a neighborhood range for a predefined distance in front of the vehicle or may define a radius around the vehicle as the neighborhood range.

If no neighborhood range is defined by the driver of the vehicle, a neighborhood range may be determined by the vehicle node 14A, as shown in block 246. This neighborhood range may be based on preset values and the traffic environment. For example, the vehicle node 14A may determine a neighborhood range based on the speed at which the vehicle is traveling or based on the level of traffic congestion in the vicinity of the vehicle (which may be based on data generated by the mobility or monitoring module of the vehicle).

In block 248, the vehicle node may dynamically detect the presence of another node associated with a vehicle in the neighborhood range of the vehicle node 14A. As with the roadside apparatus, this detection may occur by receiving a probe signal or any other data signal from a vehicle node in the neighborhood range. In the event that another vehicle node has been detected, a mobile IP network may be established between the first vehicle node 14A and the other vehicle nodes 14B to 14D (block 250).

The first vehicle node now monitors events associated with the first vehicle, as shown in operation 252. As described in accordance with the example embodiments of FIGS. 6 and 7, the event data may be monitored, sampled or generated on a continuous basis by the vehicle node 14A. In one example embodiment, the event data may include geographical location data of the first vehicle 12A, the vehicle velocity, acceleration, the type of each vehicle in the subset of vehicles, e.g., motorcycle, sedan, truck, etc., momentum and weight in combination with a time reference. The time reference may be either a specific time instant or time period. The monitored event data may further include data that has already been processed by the processing module 42 in combination with the mobility module 46 and monitoring module 48. In these circumstances, the event data may indicate a particular danger event or warning, e.g., hard breaking, traffic congestion or the like, that may be further communicated to other vehicle nodes, as discussed below.

The first vehicle node 14A may now communicate (as shown in block 254) with other vehicle nodes 14B to 14D in the neighborhood range of the first vehicle node. The first vehicle node may transmit the events data to these other vehicles or may receive events data from the vehicle nodes directly, or via other vehicle nodes. The communication is in continuously, in real-time, over the established mobile IP network.

As shown in block 256, the first vehicle node may analyze the event data received from other vehicle nodes. The processing module 42 of the first vehicle node may process and analyze the data to determine whether an event has occurred in response to which cautionary actions, e.g., breaking, should be taken. In an example embodiment, the processing module 42 of the first vehicle node may use the analyzed data to control vehicles. For example, and as shown by block 258 of FIG. 9, event data may be manipulated to assess whether a vehicle node is obscured by another vehicle. If it is determined that a vehicle node is obscured by another vehicle, the processing module 42 may assign a high priority for transmitting real-time command data to the obscured vehicle node (block 260).

As shown in block 262, command data generated from the analyzed event data is transmitted to vehicle subsystems, which vehicle subsystems of the first vehicle is controlled by the vehicle node (block 264). This results in the control of the motion of the first vehicle in the transportation system.

The vehicle node may receive, in some example embodiments, a query input from the driver of the first vehicle (block 266). The driver may use the user input interface 268 to input this query. As mentioned, these queries may for example relate to the cause of traffic congestions. In some example embodiments the driver may enter a message for alerting other drivers heading towards the same place regarding a road hazard he sees.

As shown in block 270, the vehicle node 14A may now generate a query and transmit the query to the other vehicle nodes in the wireless IP network. The driver of a vehicle that may know the answer to the query that has been communicated from the first vehicle node may respond to the query by submitting an answer via the vehicle node's user input interface. As shown in block 272, the first vehicle node receives this answer to the query from another vehicle node, either directly from the originating vehicle node, or via other vehicle nodes.

The vehicle node 14A may now display the answer to the query on the user input interface for the driver of the first vehicle to access.

The operations described according to the example embodiment of FIGS. 8 and 9 may be repeated, with the first vehicle node detecting, on an ongoing basis, whether new vehicle nodes associated with other vehicles are within the neighborhood range of the first vehicle node (FIG. 8, block 248).

From the above, it will be appreciated that, in an example embodiment, the methods and devices described herein by way of example may provide an intelligent transportation system to autonomously drive vehicles without the supervision of human drivers or passengers. The intelligent transportation system may house sensors both within vehicles and along roads. Sensors within a given vehicle may convey their real-time sense data over the given vehicle's IP LAN to a vehicle's processing module. This real-time sense data may then be shared with a nearby roadside apparatus as well as neighboring and nearby operating vehicles over a mobile IP network. The vehicles may also house digital control mechanisms such as throttle, steering, and braking mechanisms. Real-time instructions, e.g., control data, from a vehicle's processor module may be delivered to these control mechanisms by way of a vehicle's IP LAN. Alternately, real-time instructions from a roadside apparatus may be delivered to a vehicle by way of a mobile IP network.

In an example embodiment, the richness of the sense data, the sharing of the sense data amongst neighboring vehicles and roadside apparatus, the fast and accurate processing of this sense data, and the resulting fast and accurate control of the vehicles by the intelligent transportation system may improve vehicle traffic performance while at the same time reducing deaths, injury, and property loss.

Figure 10:
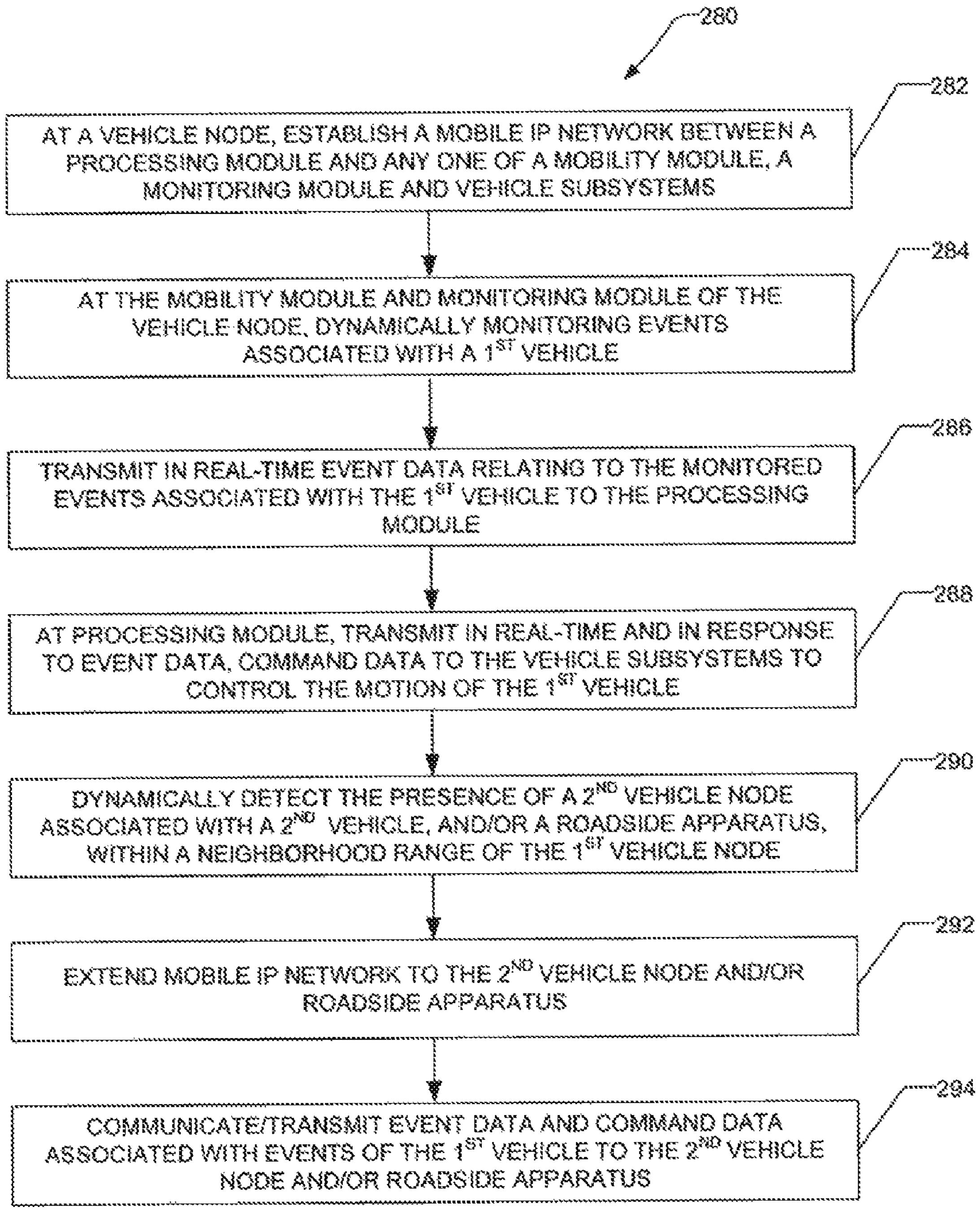
FIG. 10 shows another example of a method, in accordance with a further example embodiment, for intelligently managing a transportation network, wherein each of the vehicle nodes form a wireless IP network.

FIG. 10 shows a flow diagram of a further example method 280, in accordance with another example embodiment, for intelligently managing a transportation system in which the transportation system includes a number of vehicles 12A to 12D with a node 14A to 14D associated with each vehicle. Each of the vehicle nodes 14A to 14D may form, in this example embodiment, a wireless IP network, e.g., a wireless mesh or ad-hoc IP network.

The method 280 is performed by a first vehicle node which comprises a processing module 42, a mobility module 46, a monitoring module 48 and vehicle subsystems42. As shown by block 282, a mobile Internet Protocol (IP) network is established between the processing module 42 and any one of the mobility module 46, monitoring module 48 and vehicle subsystems54.

The mobility module 46 and monitoring module 48 of vehicle node dynamically monitor events associated with the first vehicle, as shown by block 284. In response to monitoring events, the processing module receives, in real-time, event data relating to the monitored events associated with the first vehicle from the mobility module 46 and monitoring module 48 (shown by block 286). In order to control the motion of the first vehicle, the processing module 48 now communicates in real-time (and as shown by block 286) command data to the vehicle subsystems.

The first vehicle node may now dynamically detect the presence of a second vehicle node associated with a second vehicle within a neighborhood range of the first vehicle node, the first vehicle node and the second vehicle node operating in a transportation communications network (shown by block 290). Alternatively or in addition, the first vehicle node may also dynamically detect the presence of a roadside apparatus in neighborhood range of the first vehicle node (also shown by block 290). In the event of detecting either a second vehicle node or a roadside apparatus, the first vehicle node extends the mobile IP network to the second vehicle node and/or to the roadside apparatus, as shown by block 292.

Depending on the traffic situation in the transportation network, the vehicle node may communicate event data associated with the events of the first vehicle to the second vehicle node or the roadside apparatus. Alternatively, command data may be communicated to the second vehicle node or the roadside apparatus thereby to control vehicle motion of the second vehicle or other vehicles by controlling the respective vehicle subsystems (block 294).

Figure 11:
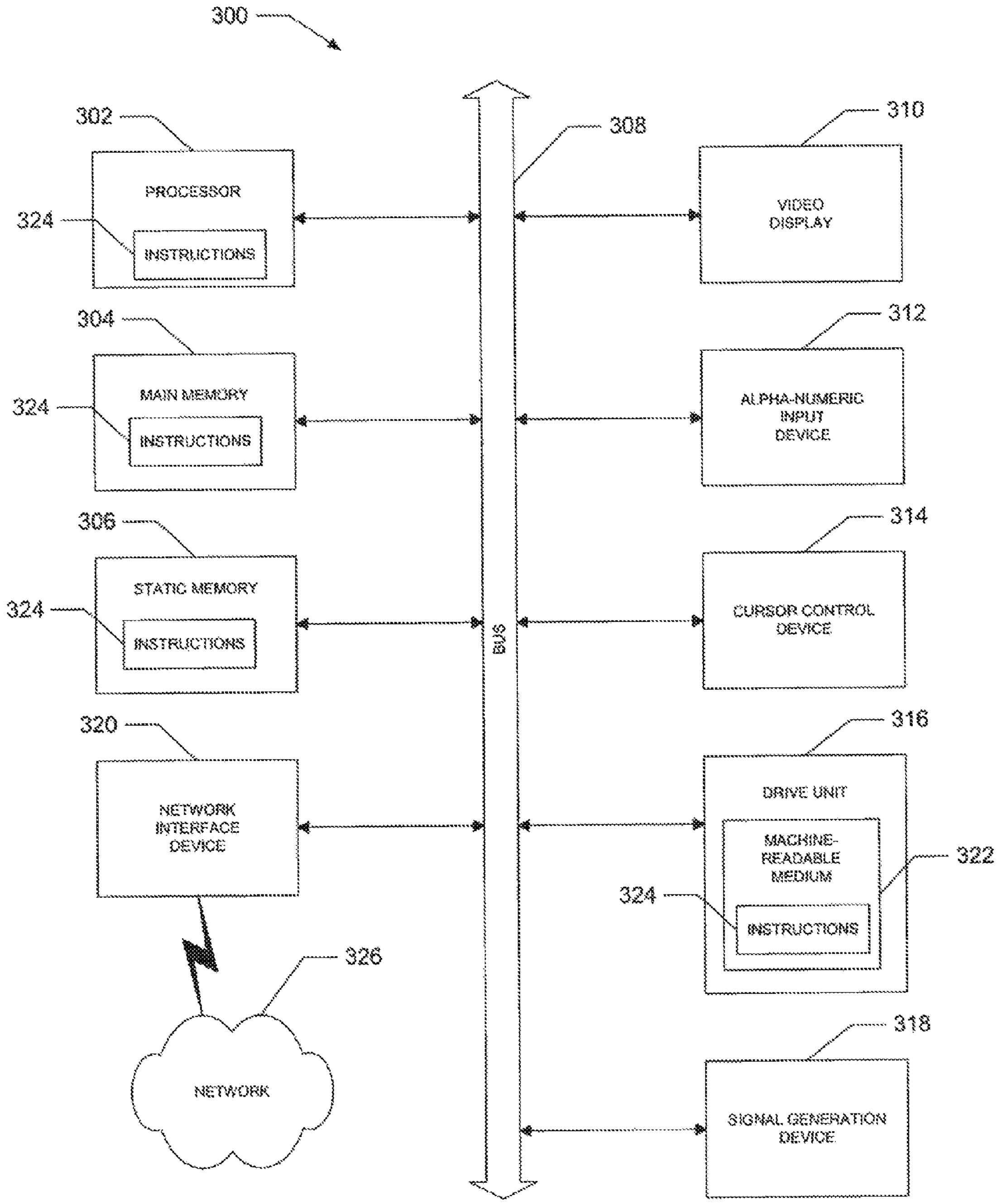
FIG. 11 shows a diagrammatic representation of machine in the example form of a computer system within which a set of instructions, for causing the machine to perform any one or more of the methodologies discussed herein, may be executed.

FIG. 11 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a plasma display, a liquid crystal display (LCD) or a cathode ray tube (CRT), touch screen). The computer system 300 also includes an alphanumeric input device 312 (e.g., a keyboard), a user interface (UI) navigation device 314 (e.g., a mouse or other interface customized for a driver of a vehicle), a disk drive unit 316, a signal generation device 318 (e.g., a speaker) and a network interface device 320. The computer system 300 may also include a two way transceiver (a receiver and a transmitter) with voice recognition capabilities so that a human driver can communicate oral instructions to the computer system 300.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., Trivial File Transfer Protocol (TFTP)).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A roadside apparatus comprising:

a communication module to dynamically establish a mobile Internet Protocol (IP) network between the roadside apparatus and a plurality of vehicle nodes associated with a plurality of respective vehicles within a road transportation network, the vehicle nodes being in neighborhood range of the roadside apparatus, and receive real-time event data over the mobile IP network from one or more of the plurality of vehicle nodes, the event data being indicative of events associated with the plurality of vehicles;

a traffic analysis module to perform traffic analysis of traffic involving the plurality of vehicles, the traffic analysis being performed based on the real-time event data; and a control module to send a real-time communication to at least one of the plurality of vehicle nodes via the communication module, responsive to performance of the traffic analysis.

2. The roadside apparatus of claim 1, in which the event data from each of the one or more vehicle nodes comprises the geographic location of the respective vehicle, the velocity of the vehicle, the acceleration of the vehicle, the momentum of the vehicle, a vehicle type of the vehicle, dimension data of the vehicle, radar data, video data or laser range distance data relating to any nearby vehicle node forming part of the mobile IP network, or the weight of the vehicle.

3. The roadside apparatus of claim 1, wherein the control module is configured to transmit, via the communication module, real-time command data over the mobile IP network to vehicle subsystems of the at least one vehicle node forming part of the mobile IP network, thereby to control the motion of the at least one vehicle.

4. The roadside apparatus of claim 3, in which the vehicle subsystems comprise one or more of a throttle subsystem, a steering subsystem or a brake subsystem.

5. The roadside apparatus of claim 3, wherein the control module is configured to generate real-time command data for a platoon of vehicles that are to move in a similar fashion, and to communicate with the control data to each of the vehicles in the platoon.

6. The roadside apparatus of claim 5, wherein the traffic analysis comprises processing the event data to assess whether the field of view of any vehicle node forming part of the mobile IP network is obstructed by another vehicle.

7. The roadside apparatus of claim 1, in which the mobile IP network communication is via the User Datagram Protocol (UDP), the Real-time Transport Protocol (RTP), Secure RTP (SRTP), Real-Time Transport Control Protocol (RTCP) or other real-time wireless technologies.

8. The roadside apparatus of claim 7, in which IP packets of the mobile IP network communication is encapsulated by Wireless mobile WiFi (IEEE 802.11p), mobile WiMax (IEEE 802.16e), Wireless PAN (IEEE 802.15.4), Mobile Broadband Wireless Access (IEEE 802.20), G3.5, or a similar protocol optimized for low latency communication in the wireless environment.

9. The roadside apparatus of claim 8, in which the mobile IP communication provides for quality of service support.

10. A method comprising:

dynamically establishing a mobile Internet Protocol (IP) network between a roadside apparatus and a plurality of vehicle nodes associated with a plurality of respective vehicles within a road transportation network, the vehicle nodes being in neighborhood range of the roadside apparatus;

receiving, at the roadside apparatus, real-time event data over the mobile IP network from one or more of the plurality of vehicle nodes, the event data being indicative of events associated with the plurality of vehicles;

performing traffic analysis, at the roadside apparatus, of traffic involving the plurality of vehicles, the traffic analysis being performed based on the real-time event data; and sending a real-time communication from the roadside apparatus to at least one of the plurality of vehicle nodes, responsive to performance of the traffic analysis.

11. The method of claim 10, in which the event data from each of the one or more vehicle nodes comprises the geographic location of the respective vehicle, the velocity of the vehicle, the acceleration of the vehicle, the momentum of the vehicle, a vehicle type of the vehicle, dimension data of the vehicle, radar data, video data or laser range distance data relating to any nearby vehicle node forming part of the mobile IP network, or the weight of the vehicle.

12. The method of claim 10, wherein the real-time communication from the roadside apparatus is configured to control vehicle subsystems associated with the at least one vehicle, thereby to control the motion of the at least one vehicle.

13. The method of claim 12, in which the vehicle subsystems comprise one or more of a throttle subsystem, a steering subsystem or a brake subsystem,

14. The method of claim 10, in which the mobile IP network communication is via real-time IP audio and video wireless services technologies having a mission critical nature.

15. The method of claim 10, further comprising transferring a data session between the roadside apparatus and a particular vehicle node from the roadside apparatus to a neighboring roadside apparatus.

16. The method of claim 10, further comprising determining a specific neighboring roadside apparatus whose sphere of control a particular vehicle node will next enter, and transferring information regarding the particular vehicle node to the specific neighboring roadside apparatus prior to entry of the particular vehicle node into the sphere of control of the specific roadside apparatus.

17. A system comprising a series of roadside apparatuses installed along a section of a roadway, each roadside apparatus comprising:

a communication module to dynamically establish a mobile Internet Protocol (IP) network between the roadside apparatus and a plurality of vehicle nodes associated with a plurality of respective vehicles within a road transportation network, the vehicle nodes being in neighborhood range of the roadside apparatus, and receive real-time event data over the mobile IP network from one or more of the plurality of vehicle nodes, the event data being indicative of events associated with the plurality of vehicles;

a traffic analysis module to perform traffic analysis of traffic involving the plurality of vehicles, the traffic analysis being performed based on the real-time event data; and a control module to send a real-time communication to at least one of the plurality of vehicle nodes via the communication module, responsive to performance of the traffic analysis.

18. The system of claim 17, wherein the mobile IP network of each roadside apparatus is configured to include at least one neighboring roadside apparatus.

19. The system of claim 17, wherein each roadside apparatus includes a handover module to transfer to a neighboring roadside apparatus a data session with a particular vehicle node.

20. The system of claim 17, wherein the traffic analysis module of a particular roadside apparatus is configured to predict a next neighboring roadside apparatus into whose sphere of control a particular vehicle node will next enter, the particular roadside apparatus further comprising a handover module to transfer information regarding the particular vehicle node to the next neighboring roadside apparatus prior to entry of the particular vehicle node into the sphere of control of the next neighboring roadside apparatus.

* * * * *

UNITED STATES PATENT AND TRADEMARK OFFICE

CERTIFICATE OF CORRECTION

PATENT NO. : 8,311,726 B2
APPLICATION NO. : 13/241966
DATED : November 13, 2012
INVENTOR(S) : Patel et al.

It is certified that error appears in the above-identified patent and that said Letters Patent is hereby corrected as shown below:

In the Claims

In column 20, line 63, in claim 13, delete "subsystem," and insert --subsystem.--, therefor Signed and Sealed this
Thirty-first Day of December, 2013

Margaret A. Focarino

Margaret A. Focarino
*Commissioner for Patents of the United States Patent and Trademark Office*